US012767139B2

(12) United States Patent
Reinker et al.

(10) Patent No.: US 12,767,139 B2
(45) Date of Patent: Oct. 20, 2026

(54) GUIDED PATH PLAN

(71) Applicant: GM GLOBAL TECHNOLOGY OPERATIONS LLC, Detroit, MI (US)

(72) Inventors: Michael J. Reinker, Beverly Hills, MI (US); Jason R. Ekelmann, Royal Oak, MI (US); Constandi John Shami, Bahama, NC (US); Ethan Thomas Dietrich, Oak Park, MI (US); Benjamin L. Williams, Milford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 70 days.

(21) Appl. No.: 18/612,297

(22) Filed: Mar. 21, 2024

(65) Prior Publication Data

US 2025/0296567 A1 Sep. 25, 2025

(51) Int. Cl.

| | |
|---|---|
| ***B60W 30/00*** | (2006.01) |
| ***B60W 30/18*** | (2012.01) |
| ***B60W 40/08*** | (2012.01) |
| ***B60W 50/10*** | (2012.01) |
| ***B60W 60/00*** | (2020.01) |
| ***G06V 20/59*** | (2022.01) |

(52) U.S. Cl.

CPC ...... *B60W 30/18163* (2013.01); *B60W 40/08* (2013.01); *B60W 50/10* (2013.01); *B60W 60/001* (2020.02); *G06V 20/597* (2022.01); *B60W 2420/403* (2013.01); *B60W 2540/223* (2020.02); *B60W 2540/229* (2020.02); *B60W 2554/406* (2020.02)

(58) Field of Classification Search

CPC ........... B60W 30/18163; B60W 40/08; B60W 50/10; B60W 60/001; B60W 2420/403; B60W 2540/223; B60W 2540/229; B60W 2554/406; G09V 20/597

See application file for complete search history.

(56) References Cited

U.S. PATENT DOCUMENTS

| | | | | |
|---|---|---|---|---|
| 11,654,902 | B1 * | 5/2023 | Dingli | B60W 30/09 701/93 |
| 11,858,509 | B2 * | 1/2024 | Zarringhalam | B60K 35/10 |
| 12,246,754 | B2 * | 3/2025 | Kim | B60W 10/188 |
| 2017/0334446 | A1 * | 11/2017 | Bosch | B60W 50/10 |

(Continued)

FOREIGN PATENT DOCUMENTS

| | | | | |
|---|---|---|---|---|
| GB | 2558386 A | * | 7/2018 | B60W 50/082 |

*Primary Examiner* — Logan M Kraft
*Assistant Examiner* — Sherman D Manley
(74) *Attorney, Agent, or Firm* — Ingrassia Fisher & Lorenz, LLP | IFL

(57) ABSTRACT

In an embodiment, a system is provided that includes one or more sensors of a vehicle and a processor of the vehicle. The one or more sensors are configured to at least facilitate obtaining sensor data representative of an intent of a user of the vehicle for the vehicle to make a maneuver during an autonomous driving mode. The processor is coupled to the one or more sensors, and is configured to at least facilitate operating the vehicle in an autonomous manner in the autonomous driving mode via instructions provided by the processor; and performing the maneuver, in accordance with instructions provided by the processor, while the vehicle otherwise maintains in the autonomous driving mode.

17 Claims, 2 Drawing Sheets

(56) References Cited

U.S. PATENT DOCUMENTS

| | | | | |
|---|---|---|---|---|
| 2019/0286127 | A1* | 9/2019 | Watanabe | B60W 50/12 |
| 2022/0126851 | A1* | 4/2022 | Lu | B60W 50/12 |
| 2022/0212717 | A1* | 7/2022 | Saito | G08G 1/167 |
| 2022/0250623 | A1* | 8/2022 | Miike | B60W 60/007 |
| 2022/0258763 | A1* | 8/2022 | Nimura | G01C 21/3407 |
| 2022/0266858 | A1* | 8/2022 | Taniguchi | B60W 30/10 |
| 2022/0281473 | A1* | 9/2022 | LaBarbera | B62D 15/025 |
| 2022/0312222 | A1* | 9/2022 | Jain | H04W 16/18 |
| 2022/0355858 | A1* | 11/2022 | Pandy | B62D 6/10 |
| 2023/0065414 | A1* | 3/2023 | Ariannezhad | G01C 21/3461 |
| 2023/0077259 | A1* | 3/2023 | Katzourakis | B60W 60/001 |
| 2023/0126269 | A1* | 4/2023 | Kim | B62D 15/025<br>701/23 |
| 2023/0150508 | A1* | 5/2023 | Nimura | G08G 1/096844<br>701/41 |
| 2023/0166773 | A1* | 6/2023 | Wong | B60W 60/0055 |
| 2023/0278588 | A1* | 9/2023 | Sung | B60R 25/01 |
| 2023/0339392 | A1* | 10/2023 | Bandi | G06V 20/17 |
| 2023/0347887 | A1* | 11/2023 | Favreau | B60W 40/09 |
| 2023/0375347 | A1* | 11/2023 | Nimura | B60W 40/06 |
| 2023/0399016 | A1* | 12/2023 | Donderici | B60W 10/20 |
| 2023/0401745 | A1* | 12/2023 | Kothari | G06T 7/70 |
| 2023/0406406 | A1* | 12/2023 | Zarringhalam | B62D 5/0457 |
| 2024/0059278 | A1* | 2/2024 | Ali | B60W 30/09 |
| 2024/0174268 | A1* | 5/2024 | Kim | B60W 60/0057 |
| 2024/0208550 | A1* | 6/2024 | Hayashi | B60W 60/0053 |

* cited by examiner

GUIDED PATH PLAN

INTRODUCTION

The technical field generally relates to platforms such as vehicles and, more specifically, to methods and systems for guiding movement in accordance with inputs provided by a user during an automatic driving mode, such as in vehicles.

Certain vehicles today have autonomous driving functionality in which the vehicle is driven, in whole or in part, via autonomous driving via a computer system of the vehicle. In certain situations in such vehicles, control may be returned to a user of the vehicle when requested by the user. However, in certain situations, such techniques may not optimally implement user intent while maintaining autonomous control over movement of the vehicle.

Accordingly, it is desirable to provide improved methods and systems for providing autonomous control while incorporating user intent, such as for vehicles. Furthermore, other desirable features and characteristics of the present disclosure will become apparent from the subsequent detailed description and the appended claims, taken in conjunction with the accompanying drawings and the foregoing technical field and background.

SUMMARY

In an exemplary embodiment, a method is provided that includes operating a vehicle in an autonomous manner in an autonomous driving mode via instructions provided by a processor of the vehicle; obtaining sensor data via one or more sensors of the vehicle, the sensor data representative of an intent of a user of the vehicle for the vehicle to make a maneuver during the autonomous driving mode; and performing the maneuver, in accordance with instructions provided by the processor, while the vehicle otherwise maintains in the autonomous driving mode.

Also in an exemplary embodiment, the method further includes interpreting, via the processor, a navigational intent of the user to perform the maneuver based on the sensor data.

Also in an exemplary embodiment, the sensor data reflects an engagement of a steering wheel of the vehicle by the user.

Also in an exemplary embodiment, the maneuver represents an intended lane change from a current lane in which the vehicle is travelling to an intended lane, for execution by the processor while the processor maintains autonomous control over the vehicle.

Also in an exemplary embodiment, the method further includes determining, via the processor using the sensor data, whether the intended lane is a viable lane of travel for the vehicle; wherein the performing of the maneuver is performed based on whether the intended lane is a viable lane of travel for the vehicle.

Also in an exemplary embodiment, the determining of whether the intended lane is a viable lane of travel is based at least in part on dimensions of the intended lane.

Also in an exemplary embodiment, the determining of whether the intended lane is a viable lane of travel is based at least in part on traffic in the intended lane.

Also in an exemplary embodiment, the determining of whether the intended lane is a viable lane of travel is based at least in part on a relative amount of traffic in the intended lane as compared with the current lane.

Also in an exemplary embodiment, the method further includes determining, via the processor using the sensor data, whether a driver has one or more hands on the steering wheel; wherein the performing of the maneuver is performed based on whether the driver has one or more hands on the steering wheel.

Also in an exemplary embodiment, the method further includes determining, via the processor using the sensor data further including one or more cameras images of a driver monitoring system, whether a driver is attentively looking at a roadway on which the vehicle is travelling; wherein the performing of the maneuver is performed based on whether the driver is attentively looking at the roadway.

In another exemplary embodiment, a system is provided that includes one or more sensors of a vehicle and a processor of a vehicle. The one or more sensors are configured to at least facilitate obtaining sensor data representative of an intent of a user of the vehicle for the vehicle to make a maneuver during an autonomous driving mode. The processor is coupled to the one or more sensors, and that is configured to at least facilitate operating the vehicle in an autonomous manner in the autonomous driving mode via instructions provided by the processor; and performing the maneuver, in accordance with instructions provided by the processor, while the vehicle otherwise maintains in the autonomous driving mode.

Also in an exemplary embodiment, the processor is further configured to at least facilitate interpreting a navigational intent of the user to perform the maneuver based on the sensor data.

Also in an exemplary embodiment, the sensor data reflects an engagement of a steering wheel of the vehicle by the user; and the maneuver represents an intended lane change from a current lane in which the vehicle is travelling to an intended lane, for execution by the processor while the processor maintains autonomous control over the vehicle.

Also in an exemplary embodiment, the processor is further configured to at least facilitate determining, using the sensor data, whether the intended lane is a viable lane of travel for the vehicle; and performing the maneuver performed based on whether the intended lane is a viable lane of travel for the vehicle.

Also in an exemplary embodiment, the processor is further configured to at least facilitate determining whether the intended lane is a viable lane of travel based at least in part on dimensions of the intended lane.

Also in an exemplary embodiment, the processor is further configured to at least facilitate determining whether the intended lane is a viable lane of travel based at least in part on traffic in the intended lane.

Also in an exemplary embodiment, the processor is further configured to at least facilitate determining whether the intended lane is a viable lane of travel based at least in part on a relative amount of traffic in the intended lane as compared with the current lane.

Also in an exemplary embodiment, the processor is further configured to at least facilitate determining, using the sensor data, whether a driver has one or more hands on the steering wheel; and performing the maneuver based on whether the driver has one or more hands on the steering wheel.

Also in an exemplary embodiment, the processor is further configured to at least facilitate determining, using the sensor data further including one or more cameras images of a driver monitoring system, whether a driver is attentively looking at a roadway on which the vehicle is travelling; and performing the maneuver based on whether the driver is attentively looking at the roadway.

In another exemplary embodiment, a vehicle is provided that includes a steering wheel, one or more sensors, and a processor. The one or more sensors are configured to at least facilitate obtaining sensor data representative of an intent of a user of the vehicle for the vehicle to make a maneuver during an autonomous driving mode, based on engagement of the steering wheel by the user. The processor is coupled to the one or more sensors, and is configured to at least facilitate operating the vehicle in an autonomous manner in the autonomous driving mode via instructions provided by the processor; interpreting a navigational intent of the user to perform the maneuver based on the sensor data; and performing the maneuver, in accordance with instructions provided by the processor, while the vehicle otherwise maintains in the autonomous driving mode.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
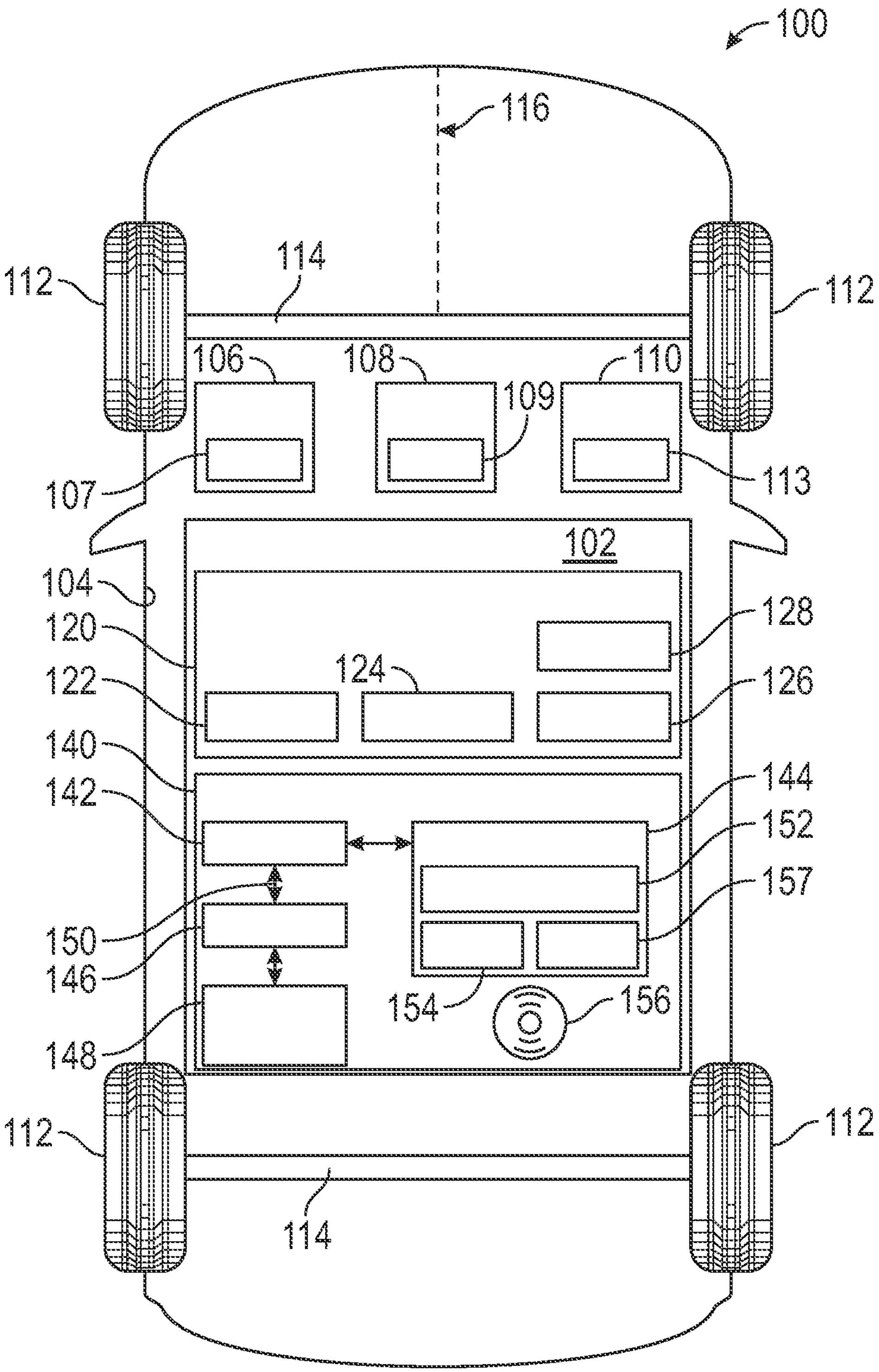
FIG. 1 is a functional block diagram of a vehicle that includes a control system for controlling autonomous operation of the vehicle while incorporating subtle inputs from a user of the vehicle, in accordance with exemplary embodiments.

FIG. 1 illustrates a vehicle 100, according to an exemplary embodiment. As described in greater detail further below, the vehicle 100 includes, among other components, a control system 102 for controlling autonomous operation of the vehicle while incorporating subtle inputs from a user of the vehicle 100, in accordance with exemplary embodiments.

In various embodiments, the vehicle 100 comprises an automobile, such as any one of a number of different types of automobiles, such as, for example, a sedan, a wagon, a truck, sport utility vehicle (SUV), or the like. In certain embodiments, the vehicle 100 may also comprise a motorcycle or other vehicle, such as aircraft, spacecraft, watercraft, and so on, and/or one or more other types of mobile platforms (e.g., a robot and/or another mobile platform).

In the depicted embodiment, the vehicle 100 includes a body 104 that is arranged on a chassis 116. The body 104 substantially encloses other components of the vehicle 100. The body 104 and the chassis 116 may jointly form a frame. The vehicle 100 also includes a plurality of wheels 112. The wheels 112 are each rotationally coupled to the chassis 116 near a respective corner of the body 104 to facilitate movement of the vehicle 100. In one embodiment, the vehicle 100 includes four wheels 112, although this may vary in other embodiments (for example for trucks, motorcycles, and certain other vehicles).

A drive system 110 is mounted on the chassis 116, and drives the wheels 112, for example via axles 114. In certain embodiments, the drive system 110 comprises a propulsion system having a motor 113.

As depicted in FIG. 1, the vehicle also includes a braking system 106 and a steering system 108 in various embodiments. In exemplary embodiments, the braking system 106 controls braking of the vehicle 100 using braking components that are controlled via inputs provided by a driver (e.g., via a brake pedal 107) and/or automatically via a control system (such as the control system 102 and/or one or more other control systems).

Figure 2:
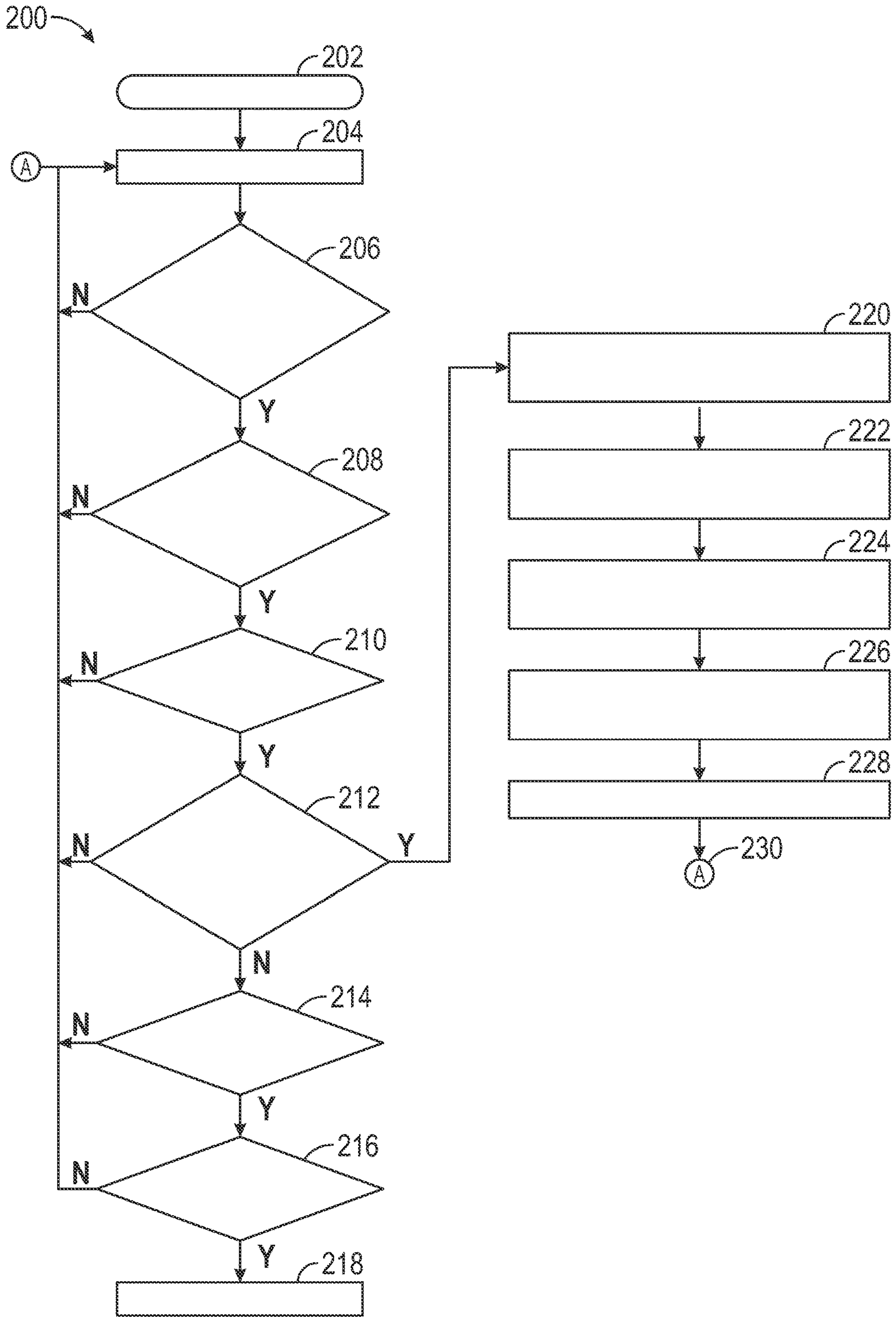
FIG. 2 is a flowchart of a process for controlling autonomous operation of the vehicle while incorporating subtle inputs from a user of the vehicle, and that can be incorporated in connection with the vehicle of FIG. 1, in accordance with exemplary embodiments.

Also in exemplary embodiments, the steering system 108 controls steering of the vehicle 100 via steering components that are controlled via inputs provided by a driver (e.g., via a steering wheel 109), and/or automatically via a control system (such as the control system 102 and/or one or more other control systems). Also in various embodiments, the steering wheel 109 is utilized by a user of the vehicle 100 in providing subtle inputs as to navigational intent that are implemented via the control system 102 while maintaining autonomous control of the vehicle 100, for example as depicted in FIG. 2 and described in greater detail further below.

In the embodiment depicted in FIG. 1, the control system 102 is coupled to the braking system 106, the steering system 108, and the drive system 110, and controls operation and functionality thereof. Also in various embodiments, the control system 102 provides for autonomous control of the vehicle 100, including while incorporating subtle inputs from a user, in accordance with the process 200 as depicted in FIG. 2 and described further below in connection therewith.

Also as depicted in FIG. 1, in various embodiments, the control system 102 includes a sensor array 120 and a controller 140, as described in greater detail below.

In various embodiments, the sensor array 120 includes various sensors that obtain sensor data as to the vehicle 100, one or more users thereof, and a roadway in which the vehicle 100 is travelling (including a current lane and nearby lanes that may server as an intended lane of travel based on user inputs). In the depicted embodiment, the sensor array 120 includes one or more steering sensors 122, detection sensors 124, and user monitoring sensors 126. In certain embodiments, the sensor array 120 may further include one or more other sensors 128.

In various embodiments, the steering sensors 122 obtain sensor data as to a steering of the vehicle 100, including a user's inputs for steering of the vehicle 100 and/or user intent pertaining thereto. In certain embodiments, the steering sensors 122 detect a user's contact with and/or engagement of the steering wheel 109. Also in certain embodiments, the steering sensors 122 detect a direction of movement of and/or engagement of the steering wheel 109, an angular position and/or movement of the steering wheel 109, one or more other components of the steering system 108 and/or the wheels 112, torque, error between steering command versus actual steering, and/or one or more other measures of steering and/or steering intent.

In various embodiments, the detection sensors 124 obtain sensor data as to a roadway on which the vehicle 100 is travelling. In various embodiments, this sensor data includes information as to lanes of the roadway, other vehicles and traffic on the lanes, and so on. In certain embodiments, the detection sensors 124 comprise one or more radar, Lidar sensors, cameras, and/or other perception and/or other detection sensors 12 for ascertaining information regarding the roadway.

In various embodiments, the monitoring sensors 126 obtain sensor data as to a driver and/or other user of the vehicle 100, including whether the user is awake, paying attention to the roadway, and so on. In certain embodiments, the monitoring sensors 126 comprise on or more cameras inside the vehicle 100, for as part of a driver monitoring system and/or user monitoring system, or the like.

In certain embodiments, one or more other sensors 128 may include, by way of example, input sensors as to a user's selection engagement and disengagement of an autonomous driving mode for the vehicle 100, among various other possible sensors in different embodiments.

In various embodiments, the controller 140 is coupled to the sensor array 120 and receives sensor data therefrom. In various embodiments, the controller 140 is further coupled to the braking system 106, steering 108, and drive system 110, and controls operation thereof.

In various embodiments, the controller 140 controls operation of autonomous driving functionality for the vehicle 100, including via control of the braking system 106, steering 108, and drive system 110, and incorporating subtle inputs from a user of the vehicle 100 as to navigational intent, among other sensor data. In various embodiments, the controller 140 provides these functions in accordance with the steps of the process 200 that is depicted in FIG. 2 and described in greater detail further below in connection therewith.

As depicted in FIG. 1, in various embodiments, the controller 140 comprises a computer system (also referred to herein as computer system 140), and includes a processor 142, a memory 144, an interface 146, a storage device 148, and a computer bus 150.

The processor 142 performs the computation and control functions of the controller 140, and may comprise any type of processor or multiple processors, single integrated circuits such as a microprocessor, or any suitable number of integrated circuit devices and/or circuit boards working in cooperation to accomplish the functions of a processing unit. During operation, the processor 142 executes one or more programs 152 contained within the memory 144 and, as such, controls the general operation of the controller 140 and the computer system of the controller 140, generally in executing the processes described herein, such as the process 200 of FIG. 2 and described further below in connection therewith.

The memory 144 can be any type of suitable memory, including various types of non-transitory computer readable storage medium. In certain examples, the memory 144 is located on and/or co-located on the same computer chip as the processor 142. In the depicted embodiment, the memory 144 stores the above-referenced program 152 along with a map database 154 (e.g., of roadways on which the vehicle 100 may travel) and other stored values 157 (e.g., look-up tables, thresholds, and/or other values with respect to autonomous control of the vehicle 100).

The interface 146 allows communication to the computer system of the controller 140, for example from a system driver and/or another computer system, and can be implemented using any suitable method and apparatus. In one embodiment, the interface 146 obtains the various data from the sensor array 120, among other possible data sources. The interface 146 can include one or more network interfaces to communicate with other systems or components. The interface 146 may also include one or more network interfaces to communicate with technicians, and/or one or more storage interfaces to connect to storage apparatuses, such as the storage device 148.

The storage device 148 can be any suitable type of storage apparatus, including various different types of direct access storage and/or other memory devices. In one exemplary embodiment, the storage device 148 comprises a program product from which memory 144 can receive a program 152 that executes one or more embodiments of one or more processes of the present disclosure, such as the steps of the process 200 of FIG. 2 and described further below in connection therewith. In another exemplary embodiment, the program product may be directly stored in and/or otherwise accessed by the memory 144 and/or a disk (e.g., disk 156), such as that referenced below.

The bus 150 serves to transmit programs, data, status and other information or signals between the various components of the computer system of the controller 140. The bus 150 can be any suitable physical or logical means of connecting computer systems and components. This includes, but is not limited to, direct hard-wired connections, fiber optics, infrared and wireless bus technologies. During operation, the program 152 is stored in the memory 144 and executed by the processor 142.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 142) to perform and execute the program.

FIG. 2 is a flowchart of a process 200 for controlling autonomous operation of a vehicle while incorporating subtle inputs from a user of the vehicle, in accordance with exemplary embodiments. In various embodiments, the process 200 can be incorporated in connection with the vehicle 100 of FIG. 1, including the control system 102 and other components thereof.

As depicted in FIG. 2, in various embodiments the process 200 begins when an autonomous driving feature is active (step 202). In various embodiments, this may comprise a default feature of the vehicle 100, and/or may be determined via user inputs via one or more user input sensors (e.g., as one of the other sensors 128 of FIG. 1), or the like.

In various embodiments, sensor data is obtained (step 204). Specifically, in certain embodiments, sensor data is obtained from the sensor array 120 of FIG. 1, including as to the vehicle 100, the users of the vehicle 100, and the roadway on which the vehicle 100 is travelling (e.g., including via the steering sensors 122, detection sensors 124, and monitoring sensors 126 of the sensor array 120 of FIG. 1).

In various embodiments, a determination is made as to whether multiple valid lanes of travel are available (step 206). Specifically, in various embodiments, a determination is made as to whether, given a current position of the vehicle 100 along the roadway, the vehicle 100 has more than one valid lane of travel that the vehicle 100 can proceed along in a safe, smooth, and continuous manner. In certain embodiments, this determination is made by the processor 142 of FIG. 1 based on sensor data from one or more detection sensors 124 (e.g., radar, Lidar sensors, exterior cameras, or the like) of the sensor array 120 of FIG. 1 and/or via map data (e.g., from the map database 154 that is stored in the memory 144 of FIG. 1). For example, in various embodiments, if the driver provides steering inputs that indicate a desire to have the vehicle 100 turn into a region that is not a lane of traffic (e.g., a shoulder of the roadway, or the like), or that would not be a valid lane (e.g., if the intended lane is too small or has a flow of traffic in an opposition direction of that of the vehicle 100, or the like), then in such cases the driver's steering inputs would be ignored.

In various embodiments, if it is determined in step 206 that multiple valid lanes of travel are not available, then the process 200 returns to step 204, as additional sensor data is collected. Conversely, in various embodiments, if it is instead determined in step 206 that multiple valid lanes of travel are available, then the process proceeds to step 208, described below.

In various embodiments, a determination is made as to whether a user's hands are on the steering wheel (step 208). Specifically, in various embodiments, a determination is made as to whether one or more hands of the driver are currently placed on the steering wheel 109 of FIG. 1. In certain embodiments, this determination is made by the processor 142 of FIG. 1 based on sensor data from one or more steering sensors 122 (e.g., a steering wheel sensor) and/or monitoring sensors 126 (e.g., an interior camera for the vehicle 100) of the sensor array 120 of FIG. 1.

In various embodiments, if it is determined in step 208 that the user's hands are not on the steering wheel 109, then the process 200 returns to step 204, as additional sensor data is collected. Conversely, in various embodiments, if it is instead determined in step 206 that the user's hands are on the steering wheel 109, then the process proceeds to step 210, described below.

In various embodiments, during step 210, a determination is made as to whether a confirmation is made as to driver attentiveness. Specifically, in various embodiments, a determination is made as to whether the driver is deemed to be paying sufficient attention to the roadway, for example as evidenced by the driver looking toward the roadway and having his or her eyes open, and so on. In certain embodiments, this determination is made by the processor 142 of FIG. 1 based on sensor data from one or more monitoring sensors 126 (e.g., one or more cameras as part of a driver monitoring system) of the sensor array 120 of FIG. 1.

In various embodiments, if it is determined in step 210 that the driver attentiveness is not confirmed, then the process 200 returns to step 204, as additional sensor data is collected. Conversely, in various embodiments, if it is instead determined in step 210 that the driver attentiveness is confirmed,, then the process proceeds to step 212, described below.

In various embodiments, during step 212, a determination is made as to whether a purposeful torque input is detected from the driver. Specifically, in various embodiments, a determination is made as to whether the driver is applied an amount of torque input to the steering wheel 109 that both (A) exceeds a minimum threshold, below which would indicate noise or random fluctuation; and (B) is less than a maximum threshold, which would indicate that the driver desires complete control over vehicle operation. In certain embodiments, this determination is made by the processor 142 of FIG. 1 based on sensor data from one or more steering sensors 122 (e.g., one or more steering wheel sensors) of the sensor array 120 of FIG. 1.

In various embodiments, if it is determined in step 212 that the purposeful torque input is detected from the driver, then the process proceeds to step 220, described further below.

Conversely, if it is determined in step 212 that the purposeful torque input is not detected from the driver, then the process 200 proceeds instead to step 214 in accordance with an exemplary embodiment. In various embodiments, during step 214, in various embodiments, a determination is made as to whether an amount of detected torque on the steering wheel 109 is greater than the minimum threshold noted above (i.e., associated with a noise level or random fluctuation).

In various embodiments, if it is determined in step 214 that the amount of torque on the steering wheel 109 is less than the minimum threshold noted above (i.e., associated with a noise level or random fluctuation), then the process 200 returns to step 204, as additional sensor data is collected. Conversely, in various embodiments, if it is instead determined in step 214 that the amount of torque on the steering wheel 109 is greater than the minimum threshold, then the process proceeds to step 216, described below.

In various embodiments, during step 216, a determination is made as to whether an amount of detected torque on the steering wheel 109 is greater than the maximum threshold noted above (i.e., associated with a driver takeover of the driving).

In various embodiments, if it is determined in step 216 that the amount of torque on the steering wheel 109 is not greater than the maximum threshold (and provided further that the criteria of steps 214 and 216 are not satisfied), then the process 200 returns to step 204, as additional sensor data is collected. Conversely, in various embodiments, if it is instead determined in step 216 that the amount of torque on the steering wheel 109 is greater than the maximum threshold, then in various embodiments the processor 142 of FIG. 1 relinquishes driving control back to the driver of the vehicle 100 (thereby deactivating the autonomous driving functionality or mode of step 202). In certain embodiments, the process 200 then terminates.

With reference back to step 212, as noted above, if is determined that a purposeful torque input is detected (i.e., that is greater in magnitude than the minimum but that is also less than the maximum value), then in various embodiments the process proceeds to step 220. In various embodiments, during step 220, the control system 102 allows for inputted torque "error". Specifically, in various embodiments, the control system 102 allows torque "error" to accumulate with respect maintenance of lane keeping boundaries, so that driver intent can be better interpreted with respect to the multiple viable lanes in which the vehicle 100 may travel going forward.

Also in various embodiments, the control system 102 "re-plans" a new possible route with respect to a new viable lane that the vehicle 100 may take (step 222). In various embodiments, the control system 102 effectively re-tunes travel planning with respect to the new viable lane for the vehicle 100. In addition, in certain embodiments, the vehicle 100 disengages other automated driving features that might have otherwise interfered with the error accumulation of step 220 and/or the replanning of step 222 (e.g., lane keeping systems, lane departure warning systems, and so on). Also in various embodiments, as part of this process (e.g., as part of step 222), the control system 102 also activates a turn signal for the vehicle 100 consistent with the input provided by the driver via the steering wheel 109 (e.g., for a right lane change or a left lane change) so as to notify other vehicles nearby and/or their drivers that a turn or lane change for the vehicle 100 may be imminent.

Also in various embodiments, the control system 102 performs checks for lane validity as to the desired lane (step 224). Specifically, in various embodiments, the control system 102 analyzes the roadway, particularly including the lane in which the driver input is interpreted as being the lane in which the driver wishes for the vehicle 100 to travel. In various embodiments, the control system 102 checks for lane validity for this lane as manifested by the driver intent, including the dimensions of the desired lane for compatibility of the vehicle 100 and a smooth transition thereto, and further including the position, dimensions, direction, speed, and acceleration of any other vehicles or other objects that may be present or approaching the desired lane, that could also affect the vehicle 100's transition into the desired lane. In addition, in certain embodiments, the control system 102 may also compare the viability of the intended as compared with the present lane of travel of the vehicle 100. Accordingly, if dimensions, traffic, or the like make the desired lane to not be a viable lane, and/or to be a lane that is significantly less viable than the present lane, then the intended lane may be determined to not be viable. Conversely, in various embodiments, if dimensions, traffic, or the like make the desired lane to be a viable lane, and/or to be a lane that is approximately of equal viability or better than the present lane, then the intended lane may be determined to be viable, and so on.

In various embodiments, the maneuver is completed (step 226). Specifically, in various embodiments, the control system 102 provides instructions for the transition and movement of the vehicle 100 into the desired lane that is represented by and consistent with the driver intent as interpreted by the control system 102 based on the driver input to the steering wheel 109. In various embodiments, the maneuver is executed and completed by the braking system 106, steering system 108, and/or drive system 110 in executing the instructions that are provided thereto by the processor 142 of the control system 102.

In various embodiments, the maneuver is completed only on the condition that the intended lane is deemed to be viable in step 224. For example, in various embodiments, if it is instead determined in step 224 that the intended lane is not viable, then in various embodiments the control system 102 either (A) waits for the lane to become viable before executed the maneuver; and/or (B) aborts the lane change maneuver, and instead keeps and maintains the vehicle 100 moving in its intended lane.

Also in various embodiments, learning is performed with respect to the maneuver (step 228). Specifically, in various embodiments, information as to the lane change maneuver is stored in the memory 144 of FIG. 1 as one or more stored values 157 therein, in accordance with instructions provided by the processor 142 of FIG. 1. In various embodiments, the information includes both the steering inputs provided by the driver as well as geographic information as to the location, roadway, and lane in which the vehicle 100 is travelling (along with the selected lane), for example so that the control system 102 can even more easily implement the driver's navigational intent in future iterations of the process 200. For example, in certain embodiments, the driver's intended lane may be saved in the memory 144 for future reference next time the vehicle 100 and/or the driver encounter the same or a similar roadway situation in the future, and in certain embodiments the intended lane may serve as a default lane of choice for the automatic driving functionality in such future iterations, and so on. In certain embodiments, this learning is performed via machine learning employed by the processor 142 of FIG. 1.

Also in certain embodiments, full control is also returned to the control system 102, and automatic driving is maintained. In various embodiments, the process 200 returns to step 204 for newly updated sensor data, as the process 200 continues in a new iteration.

Accordingly, methods, systems, and vehicles are provided for systems for guiding movement in accordance with inputs provided by a user during an automatic driving mode, such as in vehicles. In various embodiments, when the vehicle is being driven in an autonomous manner and the drive provides steering input representative of a desire to change lanes, then the control system executes the desired lane change maneuver based on whether the desired lane is a viable lane of travel for the vehicle, after which full control is returned to the control system for autonomously operating the vehicle. In various embodiments, the control system effectively operates the vehicle in a cooperative manner with the driver, so that the driver's intent (e.g., as to a desired lane change) is implemented, but while the control system otherwise maintains autonomous control of operation of the vehicle. Also in various embodiments, the driver is effectively able to "nudge" the vehicle into a desired lane or path of travel (providing that the desired lane or path is viable and suitable), while otherwise maintaining autonomous driving by the control system 102, and without having to return full control to the driver.

It will be appreciated that the systems, vehicles, and methods may vary from those depicted in the Figures and described herein. For example, the vehicle 100 of FIG. 1, including the control system 102 and/or other components thereof, may vary in different embodiments from that depicted in FIG. 1 and/or described above in connection therewith. It will similarly be appreciated that the steps of the process 200 may differ from that depicted in FIG. 2, and/or that various steps of the process 200 may occur concurrently and/or in a different order than that depicted in FIG. 2 and/or described above in connection therewith.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method comprising:

operating a vehicle in an autonomous manner in an autonomous driving mode via instructions provided by a processor of the vehicle;

obtaining sensor data via one or more sensors of the vehicle, the sensor data representative of an intent of a user of the vehicle for the vehicle to make a maneuver during the autonomous driving mode, wherein the maneuver represents an intended lane change from a current lane in which the vehicle is travelling to an intended lane, for execution by the processor while the processor maintains autonomous control over the vehicle;

determining, via the processor using the sensor data, whether the intended lane is a viable lane of travel for the vehicle;

determining, via the processor using the sensor data, whether a driver has one or more hands on the steering wheel; and performing the maneuver based on whether the intended lane is a viable lane of travel for the vehicle, in accordance with instructions provided by the processor, while the vehicle otherwise maintains in the autonomous driving mode;

wherein the determining of whether the intended lane is a viable lane of travel is based at least in part on dimensions of the intended lane.

2. The method of claim 1, further comprising:

interpreting, via the processor, a navigational intent of the user to perform the maneuver based on the sensor data.

3. The method of claim 1, wherein the determining of whether the intended lane is a viable lane of travel is based at least in part on traffic in the intended lane.

4. The method of claim 3, wherein the determining of whether the intended lane is a viable lane of travel is further based atleastin part on a relative amount of traffic in the intended lane as compared with the current lane.

5. The method of claim 1, further comprising:

determining, via the processor using the sensor data further comprising one or more cameras images of a driver monitoring system, whether a driver is attentively looking at a roadway on which the vehicle is travelling;

wherein the performing of the maneuver is performed further based on whether the driver is attentively looking at the roadway.

6. A system comprising:

one or more sensors of a vehicle that are configured to at least facilitate obtaining sensor data representative of an intent of a user of the vehicle for the vehicle to make a maneuver during an autonomous driving mode, the sensor data reflecting an engagement of a steering wheel of the vehicle by the user, and the maneuver representing an intended lane change from a current lane in which the vehicle is travelling to an intended lane, for execution by the processor while the processor maintains autonomous control over the vehicle; and a processor of the vehicle that is coupled to the one or more sensors, and that is configured to at least facilitate:

operating the vehicle in an autonomous manner in the autonomous drivingmode via instructions provided by the processor;

determining, using the sensor data, whether the intended lane is a viable lane of travel for the vehicle; and performing the maneuver based on whether the intended lane is a viable lane of travel for the vehicle, in accordance with instructions provided by the processor, while the vehicle otherwise maintains in the autonomous driving mode;

wherein the determining of whether the intended lane is a viable lane of travel is based at least in part on dimensions of the intended lane.

7. The system of claim 6, wherein the processor is further configured to at least facilitate interpretinga navigational intent of the user to perform the maneuver based on the sensor data.

8. The system of claim 6, wherein the processor is further configured to at least facilitate determining whether the intended lane is a viable lane of travel based at least in part on traffic in the intended lane.

9. The system of claim 8, wherein the processor is further configured to at least facilitate determining whether the intended lane is a viable lane of travel further based at least in part on a relative amount of traffic in the intended lane as compared with the current lane.

10. The system of claim 6, wherein the processor is further configured to at least facilitate:

determining, using the sensor data further comprising one or more cameras images of a driver monitoring system, whether a driver is attentively looking at a roadway on which the vehicle is travelling; and performing the maneuver further based on whether the driver is attentively looking at the roadway.

11. A vehicle comprising:

a steering wheel;

one or more sensors that are configured to at least facilitate obtaining sensor data representative of an intent of a user of the vehicle for the vehicle to make a maneuver during an autonomous driving mode, based on engagement of the steering wheel by the user, the sensor data reflecting an engagement of a steering wheel of the vehicle by the user, and the maneuver representing an intended lane change from a current lane in which the vehicle is travelling to an intended lane, for execution by the processor while the processor maintains autonomous control over the vehicle; and a processor that is coupled to the one or more sensors, and that is configured to at least facilitate:

operating the vehicle in an autonomous manner in the autonomous drivingmode via instructions provided by the processor;

interpreting a navigational intent of the user to perform the maneuver based on the sensor data;

determining, using the sensor data, whether the intended lane is a viable lane of travel for the vehicle; and performing the maneuver based on whether the intended lane is a viable lane of travel for the vehicle, in accordance with instructions provided by the processor, while the vehicle otherwise maintains in the autonomous driving mode;

wherein the determining of whether the intended lane is a viable lane of travel is based at least in part on dimensions of the intended lane.

12. The vehicle of claim 11, wherein the processor is further configured to at least facilitate determining whether the intended lane is a viable lane of travel based at least in part on traffic in the intended lane.

13. The vehicle of claim 11, wherein the processor is further configured to at least facilitate determining whether the intended lane is a viable lane of travel further based at least in part on a relative amount of traffic in the intended lane as compared with the current lane.

14. The vehicle of claim 11, wherein the processor is further configured to at least facilitate:

determining, using the sensor data, whether a driver has one or more hands on the steering wheel; and performing the maneuver further based on whether the driver has one or more hands on the steering wheel.

15. The vehicle of claim 11, wherein the processor is further configured to at least facilitate:

determining, using the sensor data further comprising one or more cameras images of a driver monitoring system, whether a driver is attentively looking at a roadway on which the vehicle is travelling; and performing the maneuver further based on whether the driver is attentively looking at the roadway.

16. The vehicle of claim 11, wherein the processor is further configured to at least facilitate interpreting a navigational intent of the user to perform the maneuver based on the sensor data.

17. The vehicle of claim 11, wherein the sensor data reflects an engagement of a steering wheel of the vehicle by the user.

* * * * *